United States Patent [19]

Muller

[11] Patent Number: 4,666,498

[45] Date of Patent: May 19, 1987

[54] PROCESS AND APPARATUS FOR OBTAINING RAW MATERIALS FROM AUTUMN FOLIAGE

[76] Inventor: Dietrich Muller, Handelsmannweg 1, D-2000 Hamburg 52, Fed. Rep. of Germany

[21] Appl. No.: 554,713

[22] Filed: Nov. 23, 1983

[30] Foreign Application Priority Data

Nov. 23, 1982 [DE] Fed. Rep. of Germany ....... 3243282

[51] Int. Cl.⁴ ............................................. C05F 11/02
[52] U.S. Cl. ....................................... 71/23; 23/293 R
[58] Field of Search ............................ 71/1, 11, 23, 24; 426/655; 23/293 R

[56] References Cited

U.S. PATENT DOCUMENTS 4,308,047 12/1981 Holland ................................. 71/23

FOREIGN PATENT DOCUMENTS 1198958 7/1970 United Kingdom .

OTHER PUBLICATIONS

Fisher Scientific Catalogue, 1983, pp. 329, 331, 332.
1963–Fisher Scientific Catalog, pp. 427, 429.
CA 83(23)190101t, Park, "Extraction of Ginseng Saponin", 1975.
CA 99(5):36160k, Splichert et al, "Extraction . . . Boldus", 1982.
CA 95(5):38394f, Das et al, "A Note . . . Leaves", 1979.
CA 84(13):86765x, Billot, "Pigments . . . Chlorophylls", 1975.
CA 74(25):136646a, "Possibility . . . Acetone", Vlosenok et al, 1970.
CA 96(9):65200s, Yavich et al, "Study . . . Leaves", 1981.

*Primary Examiner*—Ferris H. Lander
*Attorney, Agent, or Firm*—Cushman, Darby & Cushman

[57] ABSTRACT

The invention relates to a process for obtaining raw materials from autumn foliage, which is characterized by the fallen foliage being comminuted, extracted in one or more stages with one or more solvents and after removing the solvents, the extract or extracts and the residue are separate. The process can be performed with different solvents with different dielectric constant. From the individual extracts there are obtained new perfumes or flavoring agents or intermediate products for producing foods or feeds, or for producing selling agents or binders, as well as cosmetics, pharmaceuticals, cosmetics for treatment purposes, canning agents, fertilizers and inks, while the extraction residue can be used as a sulphur-free fuel.

11 Claims, 2 Drawing Figures

PROCESS AND APPARATUS FOR OBTAINING RAW MATERIALS FROM AUTUMN FOLIAGE

BACKGROUND OF THE INVENTION

The invention relates to a process and to an apparatus for obtaining raw materials from autumn leaves or foliage.

It is known to pick or harvest green or yellow leaves, particularly from cultivted plants and, after drying and-/or fermentation, to extract them for obtaining various constituents thereof. The idea of using fallen autumn foliage for obtaining leaf constituents in the same way has not been employed in the past because it was considered that, prior to the autumn fall of leaves, plants transfer their leaf nutrients into the branches and stem, so that the fallen leaves are largely depleted of such nutrients. Therefore, it has been conventional practice to burn autumn foliage, compost it to a limited extent, or eliminate it in some other way. A considerable problem is caused by the elimination of autumn leaves, particularly in cities, because they have to be swept together and then moved on garbage trucks to remote dumps, or have to be fed to complicated and costly composting plants.

The problem addressed by the present invention, therefore, is to provide a process for obtaining raw materials from autumn foliage, as well as an apparatus suitable for obtaining therefrom valuable chemical raw materials, which can be obtained either by extraction or as fuels from the residues.

SUMMARY OF THE INVENTION

This problem is solved by a process which comprises comminuting fallen autumn foliage, extracting one or more times with one or more solvents and after removing the solvents separating the extract or extracts and the residue.

Steam distillation can also be employed to separate the products.

It has surprisingly been found that fallen autumn leaves contain valuable and in part novel chemical raw materials in a proportion of approximately ⅓ of their dry weight, whereas ⅔ of the dry weight can be separated as fuel in the form of a residue obtained after extraction. This fuel supplies a sulphur-free waste gas, which is not injurious to the environment, is substantially ash-free, supplies little moisture and gives a relatively high calorific value of approximately 5000 kcal/kg dry weight residue.

Preferably, the process according to the invention uses solvents with different polarities for extraction purposes, in order to obtain the raw materials in the desired selectivity for the particular chemical preliminary products.

According to a preferred embodiment of the process, different solvent groups can be used with different dielectric constants and e.g. in a three-stage extraction, it is possible to start with solvents having a lower dielectric constant and then continuing the extraction in stages with solvents having higher dielectric constants. In such a multistage extraction process, different products are obtained in each stage.

When using solvents with a dielectric constant of $\xi = <30$ (solvent group A) 4 to 10% by weight of waxes, resins, essential oils and alkaloids are obtained. These can more particularly be used for producing perfumes and flavoring agents for cosmetics, pharmaceuticals and treatment cosmetic treatments.

By extraction with solvents having a dielectric constant of $\xi = 30-80$ (solvent group B), 10 to 20% by weight of carbohydrate, protein, dyes, tannins, organic bases, acids or salts are obtained, which can be used e.g. for producing alcoholic or non-alcoholic beverages, feeds or foods, tanning agents, fertilizers, inks or adhesives.

When using solvents whith a dielectric constant of $\xi = >80$ (solvent group C), 10 to 20% by weight of pectins and pentasans are obtained, which can be used for producing gelling, binding or filling agents.

Through the use of solvents, whose dielectric constants are at the limits of the aforementioned ranges and by using solvent mixtures, including those which distill azeotropically, the raw materials obtained with the aforementioned solvent groups can be obtained together, e.g. A+B together and C separately, or A separately and B+C together. Thus, the process can be carried out flexibly with respect to the desired end product.

Thus, particularly by means of solvents of groups A and B, it is possible to separate a series of novel aromas, which can be used in flavoring agents and fragrances, the aromas of fallen autumn foliage from different native trees being given in the following Table I.

TABLE I

| Species | Aroma Similar To |
|---|---|
| Maple | Rosemary/Orange |
| Apple | Camomile/sandelwood |
| Birch | Sandelwood/sage |
| Pear | Jasmin/incense |
| Oak | Hyssop/rosemary |
| Chestnut | Jasmin/hyssop |
| Larch | Myrrh/incense |
| Lime | Balm/hay |
| Plane | Fennel/sage |
| Copper beech | Patchouli/eucalyptus |
| Snake wood | Fennel/hyssop |
| Hornbeam | Eucalyptus/juniper |

Overall, the flavor aromas are close in cocoa and coffee and in species-specific manner in the fruity/nutty direction.

It was unexpectely also found that further constituents can be obtained by heating the dry residue after extraction for long periods at temperatures above 80° L C., e.g. up to 240° C. or higher and then repeating the extraction. This gives a further yield of constituents of approximately 20%. This is probably due to the fact that the leaves initially contain non-extractable starch materials which form further extractable substances only as a result of heat treatment.

Heating the residue followed by extraction can be carried out several times in succession and this can additionally lead to an increase in the yield, with product which in part are different products. The solvents or solvent systems used can be the same or different.

BRIEF DESCRIPTION OF THE DRAWINGS

The invention is described in greater detail hereinafter relative to the drawings, wherein show.

DETAILED DESCRIPTION

Figure 1:
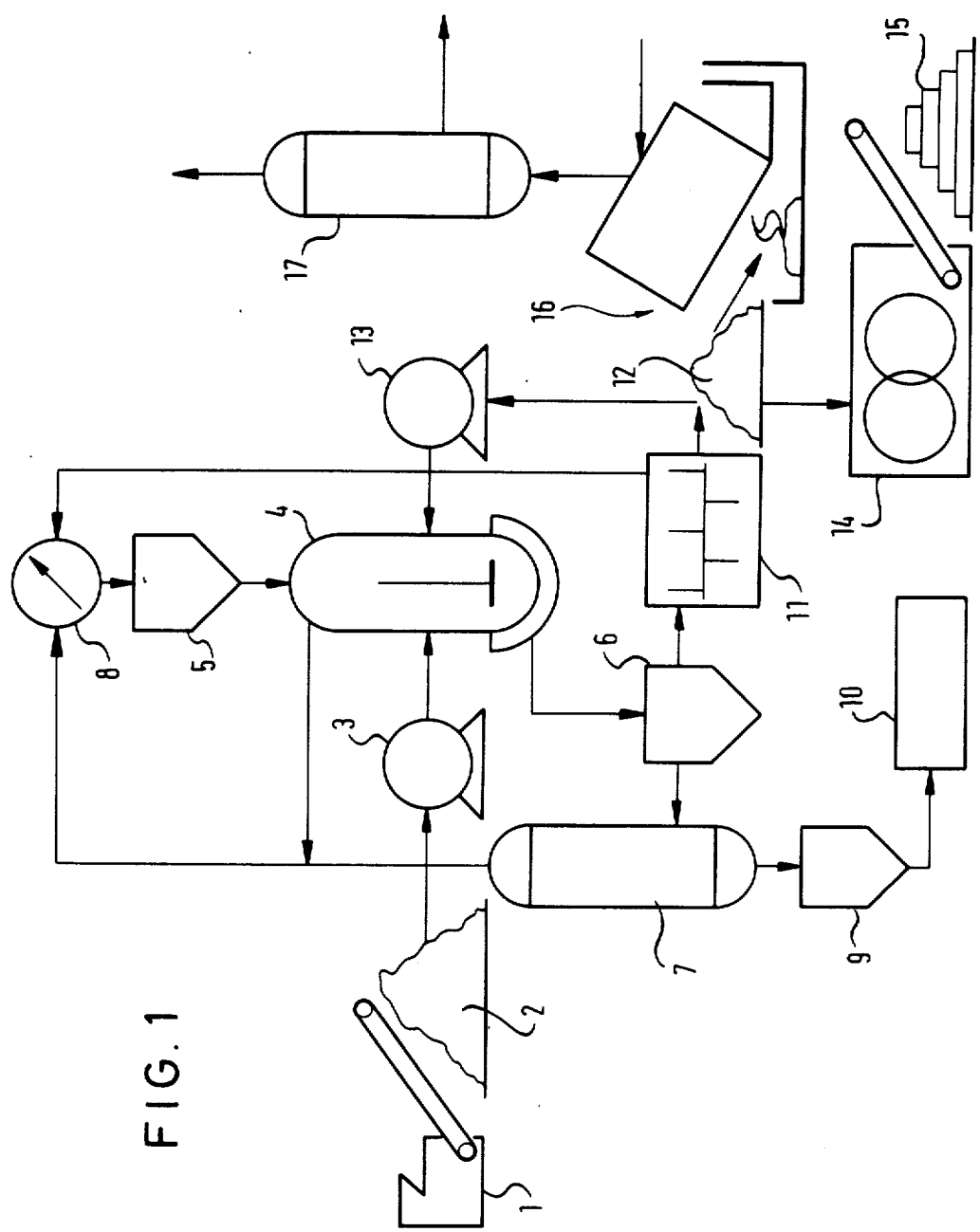
FIG. 1 a flow chart of the process according to the invention.

As shown in the flow chart of FIG. 1, all the collected autumn foliage is placed in a mill 1, where it undergoes an approximately 20 to 30:1 volume reduction and is then delivered to storage 2. By means of a pneumatic pump 3, the material is fed to an extractor 4, which is supplied with solvents from a container 5. Following extraction, the solvents and residue are separated in a centrifuge 6, the liquid phase from centrifuge 6 being fed to evaporator 7, where concentration or drying takes place. The evaporated, recovered solvent passes again via condenser 8 into container 5. The evaporation also takes place in extractor 4 and evaporated material once again is recovered by means of condenser 8. The extracted material recovered in the evaporation passes via a container 9 into a filling means 10, where it can be packaged.

Figure 2:
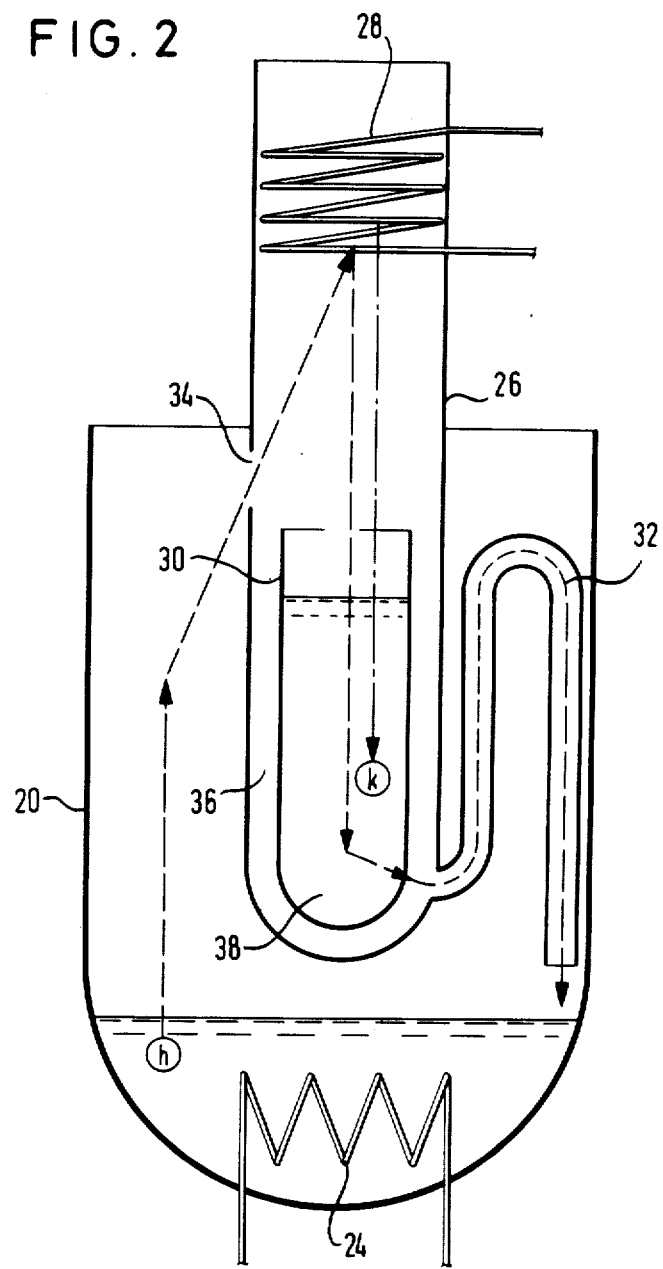
FIG. 2 a section through an apparatus for performing the process using double distillation.

The solid phase from centrifuge 6 is dried in a drier 11, the solvent vapors passing via condenser 8 into container 5. The dried residue is supplied to an intermediate storage 12 from where the residue is conveyed back into extractor 4 for further extraction stages by means of a pneumatic pump 13. Finally, the optionally following multistage extraction, this residue passes as a dry fuel via an intermediate storage 12, either via a briquetting means 14 to a final storage 15, or into the fire zone of a boiler 16. The latter supplies the process heat for the process taking palce, which corresponds to approximately ⅓ of the total thermal energy obtainable, whilst making available the remaining ⅔ for other consumers, e.g. in the form of remote heat via a heat exchanger 17. The extraction apparatus, operating on the principle of a Soxhlet apparatus, shown in section in FIG. 2 comprises a preferably cylindrical vessel 20, which has a heating source 24 in the lower region. A small diameter extraction flask 26 projects into this heatable vessel 20 and has cooling zone 28 in the upper region. The lower end of flask 26, which is equipped with a siphon 32, has an extraction chamber 36, which contains a further, smaller, porous extraction flask 30, e.g. in the form of a cardboard sleeve. With respect to extraction chamber 36, the upper part of vessel 20 acts as a heating jacket, in which the hot solvent h evaporated by heating source 24. The solvent passes in liquid form into extraction chamber 36 through an opening 34 in flask 26 and via condenser 28. The extracted material is taken up by the inner flask 30. If, apart from the main solvent h, a second azeotropically distilling solvent k is added to extraction chamber 36, and the boiling point of solvent k is appropriately below that of solvent h, two boiling processes are produced in the same apparatus, namely a double distillation. Solvent in boils out of the boiling chamber heated by heating source 24 and rises as heat-emitting vapors, via heating jacket 20 to reflux condenser 28. Solvent k boils out of the extraction chamber 36 heated by heating jacket 20 to condenser 28 and from where it drips back in liquid form into extraction chamber 36, where both solvents h and k impregnate the extracted material. As a result of the higher boiling point, solvent h is sucked in regulated manner and in liquid from into the boiling chamber through siphon 32, and as a result of its lower boiling point, solvent k boils in extraction chamber 36. Its vapor continuously exercises an inflating and whirling up effect on the vegetable extracted material 38. There is also a continuous dissolving and reseparation of those substances, which are soluble in solvent k but not in solvent h, which continuously activates the extracted material. At the end of the extraction process and after switching off the heat employed for boiling, the solvent can also be recovered from the extraction or boiling chamber.

Compared with conventional distillation processes, such a double distillation results in a reduction in time of the exhaustive extraction of by approximately 25% and leads to a much higher yield of extract during a following extraction, which is carried out e.g., with a solvent having a dielectric constant higher than that of the two previously used solvents.

It is obvious that the extraction in the process according to the invention can also be carried out in other ways, such as e.g., a throughflow of the solution without a siphon or merely by refluxing, provided that the process conditions are fulfilled that an added second solvent has a decomposing effect in the extraction chamber.

The extracts obtained from the process can be used in formulating perfumes, flavoring agents, cosmetic and pharmaceutical preparations, beverages, canning agents, inks, adhesives, gelling agents, fertilizers, binding agents, and filling agents.

The invention is explained in greater detail hereinafter relative to the examples.

The process can comprise, consist essential of, or consist of the stated steps with the recited materials.

DETAILED DESCRIPTION

Example 1

Fallen autumn copper beech leaves were collected and finely ground in air-dry form until the starting volume was reduced to 1/27. 34.38 g of ground leaves were exhaustively extracted for 4 hours in a conventional 250 ml Soxhlet apparatus. Trichloroethylene from group A with $\xi=3.4$ was used as the solvent. The extract solution obtained was evaporated by means of a rotary evaporator and a yield of 1.98 g=5.76% of the starting weight was obtained.

The extract obtained had a specific aroma like patchouli/eucalyptus and was used for preparing a fragrance in ethyl-alcohol solution with the same aroma rating.

The residue after trichloroethylene extraction was mixed, after drying, in a 1 liter flask with 300 ml of water as the solvent from group B with $\xi=78$ and was extracted for 2 hours by refluxing. The solution was then filtered under a water jet vacuum by means of a suction bottle, Buchner funnel and filter paper, concentrated and dried in the drying oven at 105° C. The yield was 3.52 g=10.24% of the starting weight.

1 g of this extract was dissolved in boiling water and, when mixed with sugar, there was obtained a spicy tasting, dark brown, non-alcoholic hot drink with a cocoa/coffee-like taste After aqueous extraction, the residue was mixed with 200 ml of a sulphuric acid solution with a pH-value of 1 as a group C solvent having an 80 and was extracted by refluxing for 2 hours and filtered in the aforementioned manner. The yield was 6.58 g=19.14% of the starting weight. The brown-black powdery extract material smelled like breadcrumbs.

Following $H_2SO_4$ extraction, the residue was dried at 105° C. in the oven and weighed 20.35 g=59.19% of the starting weight. The residue was then mixed with a solution of 1 g of the material extracted by sulphuric acid and 20 ml of water. A kneadable pulp was obtained which was shaped into balls. The balls retained their shape after air drying and consequently demonstrated the use of the extract as a binder.

Based on immediate analysis, there was carried out a roughly estimated rapid determination of the calorific value of the air-dry total residue.

Water

The difference between the weighed in and weighed out quantities (weighed in quantity 15 g) after 2 hours drying in the oven at 105° C. was 6.5%.

Ash 1 g of substance was kept in a flat porcelain dish over a powerful Bunsen flame, accompanied by air access, for 2 hours—weighed out quantity 1.5%. The material burned with a dull, long flame.

Crucible yield, volatile constituents 1 g of substance was held over a powerful Bunsen flame for 7 minutes in a covered porcelain crucible—weighed out quantity 28.5% = T.

| Volatile constituents = deficit/moisture | |
| --- | --- |
| Substance: | 100.00 |
| Coke yield: | 28.50 |
| | 71.50 |
| Moisture: | 6.50 |
| Volatile constituents = | 65.00% |

Calorific value

The calorific value calculated according to the Harpener formula:

$$H = 3664 + 112.1T - 0.6574T^2,$$

was 6325 kcal/kg. The material balance for this 3-stage extraction was as follows:

| Starting weight | 34.38 g = | 100.00% |
| --- | --- | --- |
| Trichloroethylene extract | 1.98 g = | 5.76% |
| Water extract | 3.52 g = | 10.24% |
| H$_2$SO$_4$ extract | 6.58 g = | 19.14% |
| Total extract | 12.08 g = | 35.14% |
| Residue | 20.35 g = | 59.19% |
| | 32.43 g = | 94.33% |
| Experimental losses | 1.95 g = | 5.67% |

EXAMPLE 2

Fallen autumn walnut leaves were treated in the same way as in Example 1, but in the third extraction stage the use of sulphuric acid was replaced by a KOH solution ($\xi > 80$) at a pH-value of 8. The following results were obtained:

| Starting weight | 48.84 g = | 100.00% |
| --- | --- | --- |
| Trichloroethylene extract | 2.62 g = | 5.72% |
| Water extract | 6.97 g = | 15.21% |
| KOH extract | 6.02 g = | 13.13% |
| Total extract | 15.61 g = | 34.06% |
| Residue | 28.85 g = | 62.94% |
| | 44.46 g = | 97.00% |
| Experimental losses | 1.38 g = | 3.00% |

The calorific value determined by immediate analysis as in Example 1 was approximately 6000 kcal/kg.

Sulphur the dry total residue underwent a qualitative Hepar test and no sulphur was detected.

The trichloroethylene extract had a specific aroma like marjoram/rosemary and was used in the following way to produce a skim cream.

5.4% of glycerine, 0.4% of triethanol amine, 0.3% of 50% NaOH and 69.0% water were emulsified at 75° C. into an oil phase of 10.8% stearic acid and 5.4% glycerin monostearate. The mixture was stirred cold and mixed at 40° C. with 8% of a 28% walnut extract solution in ethanol.

A cream, which could easily be rubbed into the skin, was obtained with the aforementioned aroma. Surprisingly, when used in a repeated manner, this cream had the property of lightening freckles, so that it must be assumed that walnut extract acts pharmacologically in this way.

5 g of the total residue were kept for 90 minutes at 140° C. in the drying oven. A further trichloroethylene extraction therefrom gave a further yield of 0.18 g = 1.2% = 21% of the first trichloroethylene extract.

Extract 3

In the same way as in Example 1, fallen autumn foliage of the horechesnut was successively treated with the following solvents: first stage: "Kaltron 113" ($\xi < 30$) (Kali-Chemie AG, Hannover) b.p. 47.7° C. in the Soxhlet apparatus; second stage: methanol ($\xi = 32.6$) in the Soxhlet apparatus; third stage: water, refluxing. The results were as follows:

| Starting weight | 26.48 g = | 100.00% |
| --- | --- | --- |
| Kaltron extract | 1.12 g = | 4.57% |
| Methanol extract | 3.27 g = | 12.35% |
| Water extract | 4.21 g = | 15.90% |

The Kaltron extract was used for producing a wood preservative, by heating the latter on the water bath in a small Erlenmeyer flask, accompanied by partial melting. Accompanied by agitation, this product was poured into a small beaker with 3 ml of turpentine oil. After a few hours, a dark, lard-like material was obtained. When it was rubbed on wood, it gave a polished effect to the wood, was water-repelling and had a pleasant smell.

The three-stage extraction of the horsechestnut leaves was repeated, but on this occasion in the following order: first stage: methanol in a Soxhlet apparatus; second stage: Kaltron in a Soxhlet apparatus; third stage: water, refluxing. The following results were obtained:

| Starting weight | 32.33 g = | 100.00% |
| --- | --- | --- |
| Methanol extract | 6.00 g = | 18.56% |
| Kaltron extract | 0.93 g = | 2.88% |
| Water extract | 2.08 g = | 6.43% |

It was found that the solvents were extractive in an overlapping manner and that a solvent with a moderate polarity, in this case methanol, $\xi = 32.63$, summatively extracted groups of substance from both the nonpolar and the polar solvent range.

The methanol and Kaltron extracts had a specific aroma like jasmin/hyssop.

The calorific value of the residue of the repeated extraction of horsechestnut leaves determined by immediate analysis was approximately 550 kcal/kg, i.e. well below the value determined in Example 1, which shows that the calorific value of the residue is reduced by leaving extract portions therein.

Example 4

A. Fallen autumn lime leaves were extracted in the same way as in Example 1, but in a Soxhlet apparatus with a heating jacket instead of in a steam pipe. The end of exhaustive extraction was made clear by a discolouration of the solution in the extraction chamber. The results were as follows:

| | | |
|---|---|---|
| Starting weight | 27.80 g = | 100.00% |
| Kaltron extract | 0.82 g = | 2.95% |
| Methanol extract | 3.03 g = | 10.90% |
| | Duration: | 4 hours |
| Water extract | 1.99 g = | 7.16% |

B. On repeating test A with 40 ml of Kaltron in the extraction chamber during methanol extraction, the following results were obtained:

| | | |
|---|---|---|
| Starting weight | 22.80 g = | 100.00% |
| Kaltron extract | 0.66 g = | 2.90% |
| Methanol + Kaltron extract | 2.42 g = | 10.61% |
| | Duration: | 3 hours |
| Water extract | 2.66 g = | 11.67% |

A comparison of tests A and B revealed that the exhaustive methanol + Kaltron extraction was obtained after a 25% shorter period and that with a very good coincidence of the extract weights of stages 1 and 2, a 63% higher water extraction yield was obtained, which must be attributed to the decomposing action of the Kaltron addition to the methanol during the preceding extraction.

The Kaltron and methanol extracts revealed a specific aroma like balm/hay.

4 g of the water extract were dissolved hot in 50 ml of water and added to a Petri dish, which was exposed to the air. The dark solution immediately dried to a viscous paste. Fungi and bacteria from the air deposited on the paste and developed enormous colonies after a few weeks. This revealed that the extract could be used as a nutrient and feed.

Example 5

Fallen autumn maple leaves were treated in the same way as in Example 4 but, in place of refluxing, water extraction was carried out by heating with water at 50° C., accompanied by magnetic stirring in an open beaker. The thick consistency of the solution was analogous to starch paste. This solution was separated by pressing with a linen cloth instead of by use of filtration.

Similar to test A above, the following results were obtained:

| | | |
|---|---|---|
| Starting weight | 27.98 g = | 100.00% |
| Kaltron extract | 1.32 g = | 4.72% |
| Methanol extract | 2.95 g = | 10.54% |
| Water extract | 2.56 g = | 9.12% |

Similar to test B above, the following results were obtained:

| | | |
|---|---|---|
| Starting weight | 23.93 g = | 100.00% |
| Kaltron extract | 1.10 g = | 4.60% |
| Methanol + Kaltron extract | 2.47 g = | 10.32% |
| Water extract | 3.98 g = | 16.63%. |

The two results clearly confirm the decomposing action on the leaf substance through the Kaltron addition to methanol during the following water extraction. The yield increase here was 82.3%, with very good coincidence between the extract weights of stages 1 and 2.

The Kaltron and methanol extract had a specific aroma like rosemary/orange. 2 g of the Kaltron extract were used further by melting at 80° C. in the drying oven, pouring into a small light metal mould and using a wick of a wax candle in the form of a Hindenburg light. Upon ignition, a pleasant odour was simultaneously produced outside the candle flame. This shows that the combustion products of the aromas obtained are found to be pleasant by human sensory organs.

Accompanied by vigorous magnetic stirring, 100 ml of boiling water were poured over 5.4 g of the dry water extract in a 250 ml Erlenmeyer flask. Approximately 30 ml of a filtered hot water extract of 15 g of cut up cured malt in 100 ml of water were added to the resulting creamy solution at 50° C. Stirring was continued for 1 hour at approximately 50° C. After cooling to 30° C., 3 g of water-pasted baker's-yeast were added to the solution and the flask was provided with a fermentation fixture. Fermentation took palce at approximately 25° C. for approximately 4 days. The fermented solution was filtered by decanting over a folded filter and, when cooled, gave a brown, pleasantly smelling alcoholic cold drink.

Example 6

A single-stage methanol extraction was carried out on the fallen autumn leaves of pear trees. The residue was heated and extracted again and this stage was repeated several times.

48.62 g of leaves were extracted with methanol in a Soxhlet apparatus. The residue obtained was kept for 100 minutes at 150° C. in the drying oven and then extracted again with methanol in the Soxhlet apparatus. The residue obtained was again kept for 100 minutes at 150° C. in the oven and then extracted again as previously.

The extraction yields were as follows:

| | | |
|---|---|---|
| 1. During first extraction | 14.17 g = | 29.14% |
| 2. During the second extraction after heating | 1.75 = | 3.60% (12.34% of the first stage) |
| 3. During the third extraction after heating | 1.09 g = | 2.24% (7.69 of the first stage). |

This test shows that a first heat treatment of the residue following the first extraction gave a yield increase of approximately 12% and that a second heat treatment of this further residue after the second extraction gave a further yield increase of approximately 7%, so that the total yield increase was approximately 20%.

For comparison purposes, 31 g of the same leaves were kept for 100 minutes at 150° C. in the drying oven before extraction and then extracted, giving 9.23 g=29.77%. This shows that a preextraction heat treatment only gave an extremely small yeild increase of approximately 2% compared with the first extraction without heat treatment.

In all cases, the methanol extract of the leaves gave a specific aroma like jasmin/incense.

Example 7

A multiplex extraction was carried out on the fallen autumn foliage of the snake wood tree, whose leaves are relatively rich in constituents. Aetone/methanol/water was used as the extracting agent.

32.35 g of leaves were firstly extracted with acetone ($\xi = 20.7$) in the Soxhlet apparatus, then with methanol and then with water at 60° C. accompanied by magnetic stirring. The residue of this extraction stage was kept in the drying oven at 130° C. for 100 minutes and then extracted as hereinbefore.

For comparison purposes, 31.24 g of the same leaves were kept in the drying oven at 150° C. for 100 minutes prior to extraction and then extracted as above.

The extraction yields are given in the following Table II:

TABLE II

|  | 1st Extraction | 2nd Extraction After Heating | Comparison |
|---|---|---|---|
| Acetone | 4.26 g = 13.17% | 0.13 g = 0.40% (3.04% of the yield of 1) | 2.25% = 7.20% |
| Methanol | 5.31 g = 16.41% | 0.35 g = 1.08% (6.58% of the yield of 1) | 5.45 g = 17.45% |
| Water | 1.96 g = 6.06% | 0.71 g = 2.19% (36.14 of the yield of 1) | 1.83 g = 5.86% |
| Total | 35.64% | 3.67% (10.29% of the yield of 1) | 30.51% |

These tests show that the supplemental yield by heat treatment after the first extraction depends greatly on the polarity of the extracting agent, i.e. in the present case with acetone:methanol:water in the ratio of 1:2:12.

The total supplementary yield was approximately 10% below the values of Example 6, which is explained by the high constituent level of the snake wood leaves. The tests also show that the heat treatment more particularly supplies water-soluble polar constituents.

In the comparison test, where the heat treatment was carried out prior to extraction, it was found that the total yield was only approximately 85% of the yield obtained by heat treatment after the first extraction. This is probably due to the fact that through the heat treatment the lighter, volatile, nonpolar constituents of the leaves are largely lost and the total yield is considerably reduced. This is dependent on the total content of the readily volatile constituents in the leaves.

The acetone and methanol extracts of snake wood leaves obtained had a specific aroma like fennel/hyssop.

Example 8

In order to clarify the influence of the temperature level and the duration of the heat treatment on the supplemental quantity obtained, fallen apple tree leaves are extracted with acetone/methanol/water as in Example 7. The table below gives the yields of the following process stages.

Test A 31.9 g of leaves were extracted with acetone in the Soxhlet apparatus, then with methanol in the Soxhlet apparatus and then at 60° C. and accompanied by magnetic stirring with water.

Test B

The residue of test A was kept for 50 minutes at 90° C. in the drying oven and then extracted as in test A.

Test C

Prior to extraction, 30.56 g of leaves were kept at 90° C. in the drying oven for 50 minutes and then extracted as in test A.

The extract yields are given in following Table III.

TABLE III

| Acetone | 6.27 g = 20.17% | 0.06 g = 0.19% = 0.94% of the yield of A | 5.71 g = 18.69% |
|---|---|---|---|
| Methanol | 3.36 g = 10.81% | 0.10 g = 0.32% = 2.96% the yield of A | 3.05 g = 9.98% |
| Water | 1.80 g = 5.79% | 0.52 g = 1.67% = 28.84% the yield of A | 2.01 g = 6.58% |
| Total | 36.77% | 2.18% = 5.93% of the yield of A | 35.25% |

These results show that the quantity of the supplemental yield supplied by the heat treatment after the first extraction depends greatly on the temperature and the duration of the heat treatment, the yield decreasing with lower temperature and lower duration, as is shown by a comparison test series B with the corresponding values of Example 7. At 90° C. and 50 minutes with 5.93% of the yield of test A, approximately only half the yield of the corresponding case in Example 7 was obtained, although in both cases the leaves had a high constituent content.

The dependence of the yield on the polarity of the solvents corresponds to the values of example 7. In Example 8 the ratio of solvents is 1:1.7:8.8.

The values of test C shows that supplemental yield supplied by the heat treatment prior to extraction under relatively cold conditions, although resulting in a lower loss of volatile nonpolar constituents and even a gain in polar constituents, results in a yield which was only roughly 95% of that of test A, i.e. the total yield was not improved.

The aroma of the acetone and methanol extract obtained in these tests was like camomile/snadelwood.

It was found that a supplement in yield could only adantageously be obtained through a heat treatment after a first extraction, whereas in the case of heat treatment prior to extraction, the volatile nonpolar constituents were lost and that such losses were unavoidable particularly under mild conditions.

In view of the pronounced temperature and time dependence of the supplemental yield by heat treatment prior to extraction, the heat treatment should not take place either at below 70° C. or for less than 20 minutes.

Example 9

The following example shows that the multiple extractions with several solvents can also be made by steam distillation, especially under vacuum.

Fallen autumn maple leaves in finely ground form were added into a flask together with water (a solvent of group B) and heated. Some of the products obtained were dissolved, while others were driven off together with the steam. The condensed material from the steam distillation was then extracted with a solvent from group A as in Example 1.

What is claimed is:

1. A process for obtaining raw material from autumn foliage comprising:

comminuting the autumn foliage;

extracting the thus comminutated autumn foliage using, in succession and in order of increasing dielectric constants, solvents from at least two of the solvent groups A, B and C wherein the solvents from solvent group A have a dielectric constant $\epsilon$ equal to or less than 30, solvents from group B have a dielectric constant $\epsilon$ from 30 to 80 and solvents from solvent group C have a dielectric $\epsilon$ greater than 80.

2. A process according to claim 1, wherein said extraction is conducted using water as one of said solvents and wherein said water is in the form of steam.

3. The composition comprising an extraction product obtained in accordance with claim 1.

4. A process according to claim 1 wherein the foliage is selected from the group consisting of walnut, horsechestnut, maple, apple, birch, pear, oak, chestnut, larch, lime, plane copper beech, snake wood, and hornbeam autumn foliage and the extraction residue is heated at least once to a temperature of 80° to 240° C. and after each heating operation extracting with a solvent.

5. A process according to claim 1, wherein the foliage is selected from the group consisting of walnut, horsechestnut, maple, apple, birch, pear, oak, chestnut, larch, lime, plane, copper beech, snake wood, and hornbeam autumn foliage.

6. A process according to claim 1 wherein the extraction is carried out with at least three extractions in succession employing in the successive extractions solvents from each of groups A, B and C.

7. A process according to claim 6 comprising heating the extraction residue at least once to a temperature of 80° to 240° C. and after each heating operation extracting with a solvent.

8. The composition comprising an extraction product obtained in accordance with claim 6.

9. A process according to claim 1 wherein the extraction is carried out employing at least three extractions and using in succession a solvent from group A and then two different solvents from Group B, the solvent in Group B having the lower dielectric constant being employed before the solvent in Group B having the higher dielectric constant.

10. A process according to claim 9 comprising heating the extraction residue at least once to a temperature of 80° to 240° C. and after each heating operation extracting with a solvent.

11. A process according to claim 1 comprising heating the extraction residue at least once to a temperature of 80° to 240° C. and after each heating operation extracting with a solvent.

* * * * *